United States Patent
LeCrone et al.

(10) Patent No.: US 10,997,101 B1
(45) Date of Patent: May 4, 2021

(54) ACCESSING SECONDARY STORAGE

(71) Applicant: EMC IP Holding Company LLC, Hopkinton, MA (US)

(72) Inventors: Douglas E. LeCrone, Hopkinton, MA (US); Bruce A. Pocock, Hoschton, GA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/671,249

(22) Filed: Nov. 1, 2019

(51) Int. Cl.
*G06F 13/28* (2006.01)
*G06F 13/10* (2006.01)

(52) U.S. Cl.
CPC ............ *G06F 13/28* (2013.01); *G06F 13/102* (2013.01); *G06F 13/105* (2013.01)

(58) Field of Classification Search
CPC combination set(s) only.
See application file for complete search history.

(56) References Cited

U.S. PATENT DOCUMENTS

| | | | |
|---|---|---|---|
| 8,219,653 B1 * | 7/2012 | Keagy ...................... | G06F 8/63 709/222 |
| 8,898,444 B1 * | 11/2014 | LeCrone ............. | G06F 9/45558 710/1 |
| 9,170,904 B1 | 10/2015 | LeCrone et al. | |
| 9,645,766 B1 | 5/2017 | LeCrone | |
| 9,665,502 B1 | 5/2017 | Jones et al. | |
| 10,452,580 B2 * | 10/2019 | Davda ...................... | G06F 13/28 |
| 10,579,481 B1 * | 3/2020 | LeCrone .................. | G06F 3/067 |
| 2011/0060883 A1 * | 3/2011 | Otani ..................... | G06F 3/0631 711/162 |
| 2013/0111094 A1 * | 5/2013 | Culter ................. | G06F 13/4282 710/300 |
| 2014/0281526 A1 * | 9/2014 | Lindteigen .......... | H04L 63/0442 713/168 |
| 2015/0261720 A1 * | 9/2015 | Kagan ................. | G06F 13/4221 710/308 |
| 2016/0364346 A1 * | 12/2016 | Yang ....................... | G06F 13/28 |

OTHER PUBLICATIONS

Jon Entwistle, "IBM System z10 FICON Express8 FCP Channel Performance Report," Technical paper, Aug. 2009, 27 pp.
Cathy Cronin, IBM System z10 I/O and High Performance FICON for System z Channel Performance, Technical paper, IBM Corporation, Jan. 28, 2009, 33 pp.

* cited by examiner

*Primary Examiner* — Raymond N Phan
(74) *Attorney, Agent, or Firm* — Muirhead and Saturnelli, LLC

(57) ABSTRACT

A host coupled to a storage system accesses secondary storage coupled to the storage system and to the host by determining if direct data access between the storage system and the secondary storage is operational, the host forwarding commands to the storage system to directly access the secondary storage in response to direct data access between the storage system and the secondary storage being operational, and the host generating modified commands to cause the host to directly access the secondary storage in response to direct data access between the storage system and the secondary storage not being operational. The secondary storage may be a cloud storage. The secondary storage may be a tape emulation unit. The host may directly access data of the tape emulation unit by accessing a storage device of the tape emulation unit. Commands on the host may be modified by a drivers layer on the host.

20 Claims, 6 Drawing Sheets

ACCESSING SECONDARY STORAGE

TECHNICAL FIELD

This application relates to the field of computer systems and storage systems therefor and, more particularly, to the field of transferring data between storage systems.

BACKGROUND OF THE INVENTION

Host processor systems (hosts) may store and retrieve data using a storage system containing a plurality of host interface units (I/O modules), physical storage units (e.g., disk drives, solid state drives), and disk interface units (disk adapters). The host systems access the storage system through a plurality of channels provided therewith. Host systems provide data and access control information through the channels to the storage system and the storage system provides data to the host systems also through the channels. The host systems do not address the physical storage units of the storage system directly, but rather, access what appears to the host systems as a plurality of logical volumes. The logical volumes may or may not correspond to the physical storage units. Allowing multiple host systems to access the single storage system allows the host systems to share data stored therein.

In some cases, it is desirable to use secondary storage that is coupled to a storage system for data transfers directly between the storage system and the secondary storage. The secondary storage may be cloud storage, a tape device (e.g., a tape emulation device), or some other type of secondary storage. Data may be transferred directly between the storage system and the secondary storage based on commands and data from applications running on a host. For example, an application running on a host may instruct the storage system to transfer particular data from the storage system to a tape emulation device. Transferring data directly between the storage system and the secondary storage reduces any inefficiencies that would occur if the data were being transferred via the host.

However, in some cases, it may not be possible to transfer data directly between a storage system and secondary storage. For example, a storage system may not be configurable for directly accessing cloud storage and/or a tape unit. Moreover, even in instances where a storage system may be configurable to access secondary storage, there may be policy/security reasons to prevent direct access nonetheless. In addition, storage systems that are configured for direct access to secondary storage may have that access interrupted by, for example, hardware or communication failures during operation. Applications on the host that expect direct access between the storage system and the secondary storage either need to be rewritten when direct access is not available or need to contain logic to anticipate that access may or may not be available. Rewriting applications may not be practical, especially for legacy applications for which source code may not be available.

Accordingly, it is desirable to provide a mechanism to allow access to secondary storage in systems where direct access between a storage system and secondary storage is not necessarily available.

SUMMARY OF THE INVENTION

According to the system described herein, a host coupled to a storage system accesses secondary storage coupled to the storage system and to the host by determining if direct data access between the storage system and the secondary storage is operational, the host forwarding commands to the storage system to directly access the secondary storage in response to direct data access between the storage system and the secondary storage being operational, and the host generating modified commands to cause the host to directly access the secondary storage in response to direct data access between the storage system and the secondary storage not being operational. The secondary storage may be a cloud storage. The secondary storage may be a tape emulation unit. The host may directly access data of the tape emulation unit by accessing a storage device of the tape emulation unit. The host may only modifies commands that would have caused direct data access between the storage system and the secondary storage. Commands on the host may be modified by a drivers layer on the host. The host may access data on the storage system following directly accessing data on the secondary storage.

According further to the system described herein, a non-transitory computer readable medium contains software that causes a host coupled to a storage system to access secondary storage coupled to the storage system and to the host. The software includes executable code that determines if direct data access between the storage system and the secondary storage is operational, executable code that causes the host to forward commands to the storage system to directly access the secondary storage in response to direct data access between the storage system and the secondary storage being operational, and executable code that causes the host to generate modified commands to cause the host to directly access the secondary storage in response to direct data access between the storage system and the secondary storage not being operational. The secondary storage may be a cloud storage. The secondary storage may be a tape emulation unit. The host may directly access data of the tape emulation unit by accessing a storage device of the tape emulation unit. The host may only modifies commands that would have caused direct data access between the storage system and the secondary storage. Commands on the host may be modified by a drivers layer on the host. The host may access data on the storage system following directly accessing data on the secondary storage.

According further to the system described herein, a system includes a storage system, a secondary storage coupled to the storage system, and a host, coupled to the storage system and the secondary storage system. The host includes a processor that executes software on a non-transitory computer readable medium, the software including executable code that determines if direct data access between the storage system and the secondary storage is operational, executable code that causes the host to forward commands to the storage system to directly access the secondary storage in response to direct data access between the storage system and the secondary storage being operational, and executable code that causes the host to generate modified commands to cause the host to directly access the secondary storage in response to direct data access between the storage system and the secondary storage not being operational. The secondary storage may be a cloud storage. The secondary storage may be a tape emulation unit. The host may directly access data of the tape emulation unit by accessing a storage device of the tape emulation unit. The host may only modifies commands that would have caused direct data access between the storage system and the secondary storage. Commands on the host may be modified by a drivers layer on the host. The host may access data on the storage system following directly accessing data on the secondary storage.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides access to secondary storage by a host in systems where direct access between a storage system and secondary storage is not necessarily available. A drivers layer of the host intercepts and modifies commands/data that are meant to instruct the storage device to directly access secondary storage. The modifications cause the host, instead of the storage system, to access the secondary storage.

Figure 1:
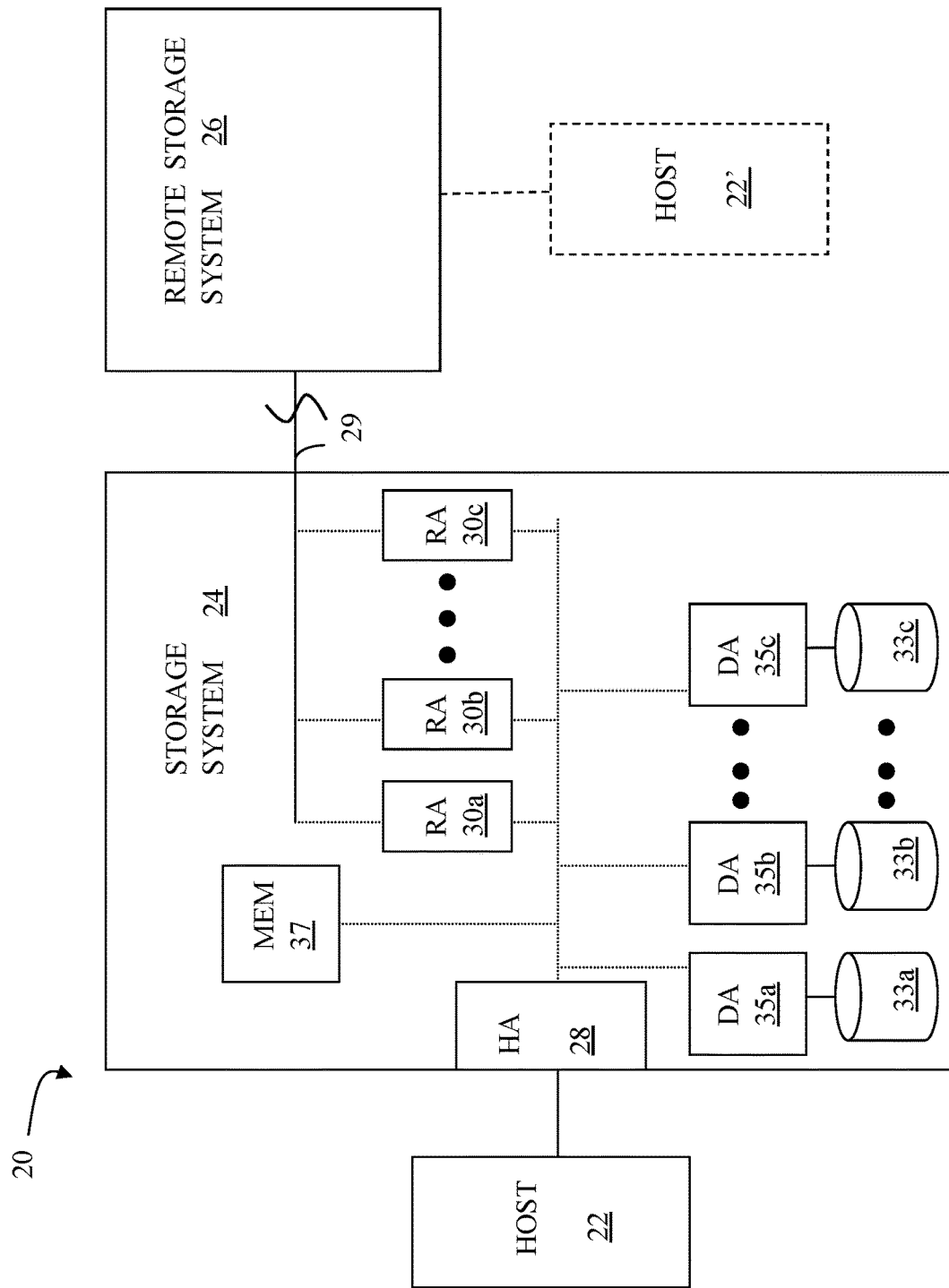
FIG. 1 is a schematic illustration showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a Symmetrix, PowerMax or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
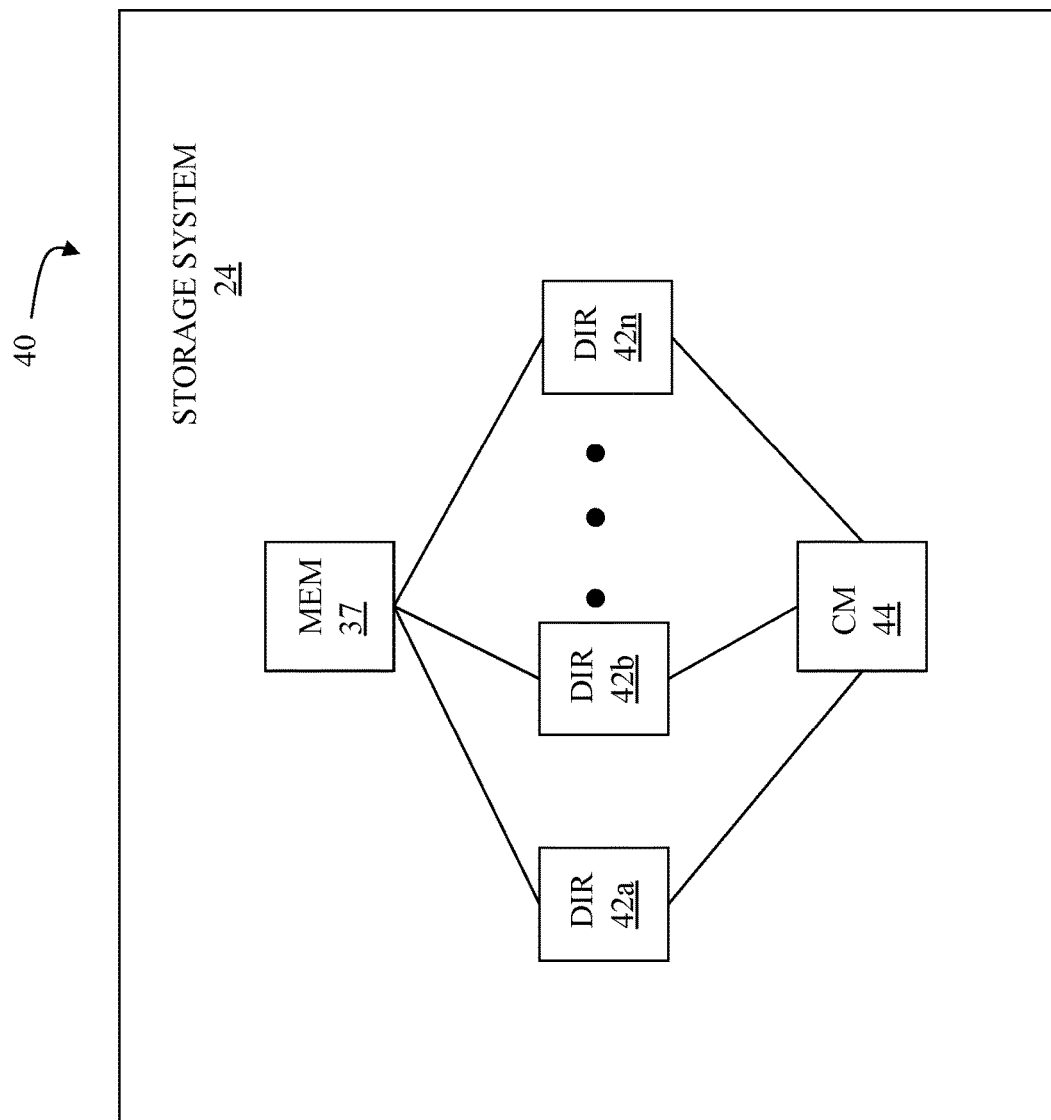
FIG. 2 is a schematic diagram illustrating an embodiment of a storage system where each of a plurality of directors are coupled to a memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3A:
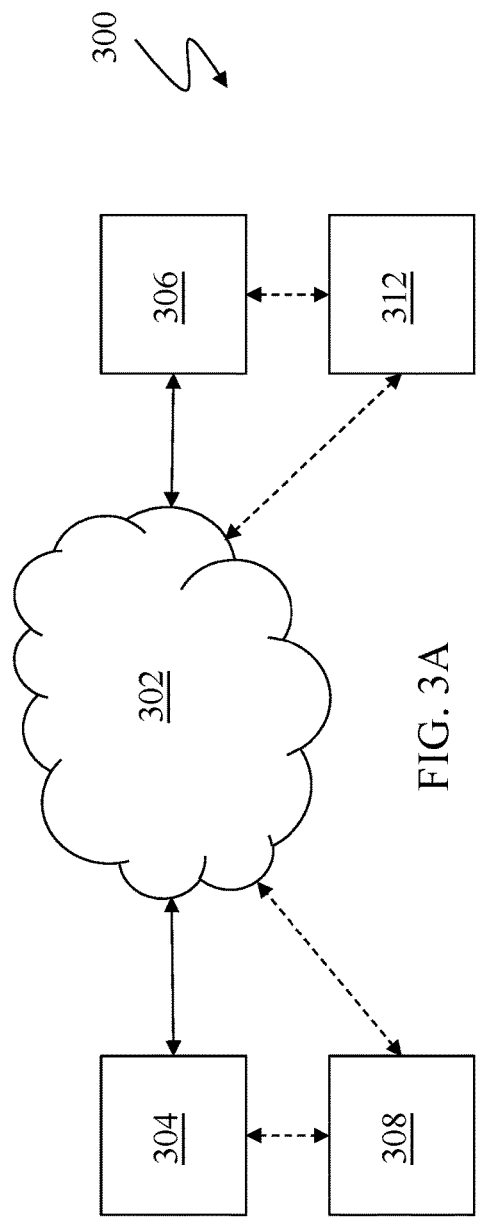
FIGS. 3A and 3B are schematic diagrams showing a cloud storage and storage systems coupled thereto according to embodiments of the system described herein.

Referring to FIG. 3A, a diagram 300 illustrates using a cloud storage 302. The cloud storage 302 may be a private cloud storage provided by an organization for its own internal use, a semi-private cloud storage provided by a collection of organizations for use by members, or a public cloud storage such as Amazon Web Service (AWS) or Microsoft Azure. The cloud storage 302 provides security controls so that only authorized users may access data and possibly so that some of the users are only able to read data. In an embodiment herein, the cloud storage 302 may be accessible from any location via the World Wide Web, although it may be possible to impose restrictions on access, such as geographic restrictions (e.g., prohibiting access from Internet addresses originating in certain countries). In other embodiments, the cloud storage 302 may be part of a private network that is not generally accessible, but may nonetheless be geographically diverse.

A first storage system 304 and a second storage system 306 are couple to the cloud storage 302 and exchange data therewith. The cloud storage acts as a secondary storage for the storage systems 304, 306. One or both of the storage systems 304, 306 may be similar to the storage system 24, described above, and may be storage arrays provided by Dell EMC of Hopkinton, Mass., although other types of storage systems are possible. Data connections between the storage systems 304, 306 and the cloud storage 302 may be provided by any appropriate mechanism, including the Internet, other TCP/IP networks, dedicated connections, FICON connections, etc. Each of the storage systems 304, 306 may provide data storage for one or more host systems coupled thereto so that, for example, the storage system 304 provides data storage for a host 308 and the storage system 306 provides data storage for a host 312. The host 308 may be coupled to the storage system 304 using any appropriate mechanism. Similarly, the host 312 may be coupled to the storage system 308 using any appropriate mechanism. Data is exchanged between the cloud storage 302 and the storage system 304. Similarly, data is exchanged between the cloud storage 302 and the storage system 306. The hosts 308, 312 may be coupled directly to the cloud storage 302 (shown in FIG. 3A as dashed lines) to provide an alternative data transfer mechanism between the hosts 308, 312 and the cloud storage 302, described in more detail elsewhere herein.

Figure 3B:
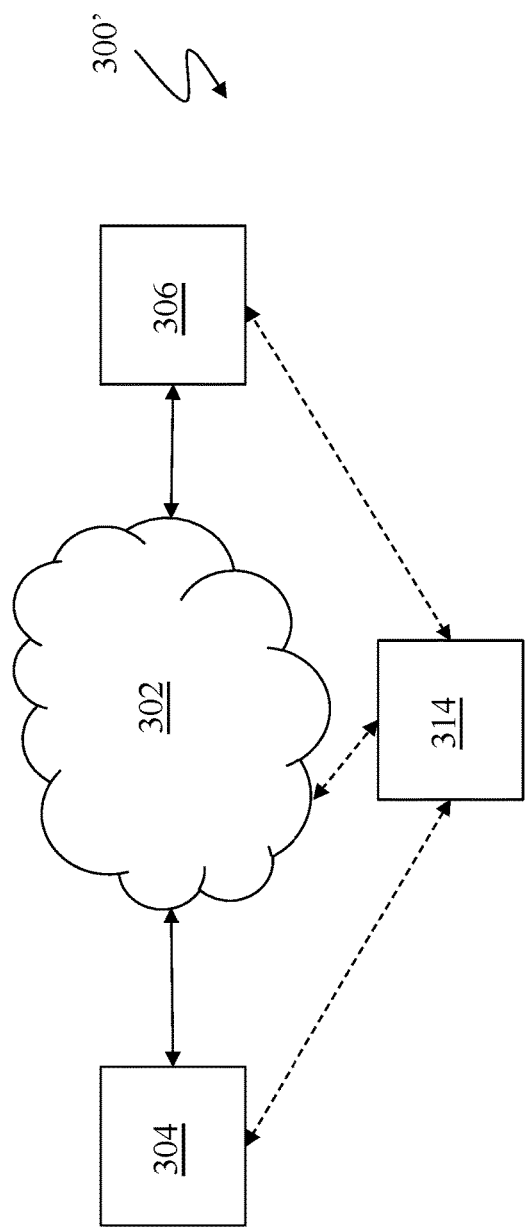

Referring to FIG. 3B, a diagram 300' illustrates a system that is similar to the system described above in connection with the diagram 300. The diagram 300' shows the storage systems 304, 306 coupled to the cloud storage 302, which acts as a secondary storage. However, in the diagram 300', a host 314 is coupled to both the storage system 304 and the storage system 306. Data is exchanged between the cloud storage 302 and the storage system 304 and exchanged between the cloud storage 302 and the storage system 306. The host 314 may be coupled directly to the cloud storage 302 (shown in FIG. 3B as a dashed line) to provide an alternative data transfer mechanism between the host 314 and the cloud storage 302, described in more detail elsewhere herein.

Figure 4:
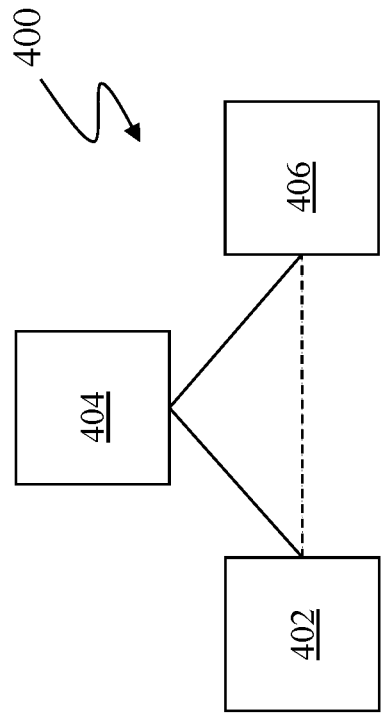
FIG. 4 is a schematic diagram showing a host, a storage system, and a tape emulation device used in connection with an embodiment of the system described herein.

Referring to FIG. 4, a diagram 400 shows a host 402 coupled to a storage system 404 that is coupled to a tape unit 406. The tape unit 406 acts as a secondary storage to the storage system 404. The host 402 may be similar to the hosts 22, 22' described above and may be any appropriate computing system, such as an IBM System z computing system. The storage system 404 may be similar to the storage systems 24, 26 described above and may be any storage system capable of providing the functionality described herein, such as a storage array provided by Dell EMC of Hopkinton, Mass. The tape unit 406 may be any physical tape unit or may be a tape emulation unit that provides tape emulation functionality so that a device writes tape data and commands to the tape emulation unit 406 and reads tape data and status information from the tape emulation unit 406 as if the tape emulation unit 406 were an actual computer tape device. The tape unit 406 may be implemented using any appropriate device, such as the DLm960 tape emulation device provided by Dell EMC of Hopkinton, Mass. The tape unit 406 may also correspond to any out-of-band (00B) storage mechanism that represents additional storage capability beyond storage capabilities provided by the storage system 404. In an embodiment herein, data is exchanged with the tape unit 406 using any appropriate format. Note that, although only a single host 402, a single storage system 404, and a single tape unit 406 are shown, it is understood by one of ordinary skill in the art that the system may be extended to have more than one of one or more of each.

The host 402, the storage system 404, and the tape unit 406 may be coupled using a conventional FICON connection or possibly a network, such as the Internet, a different TCP/IP network, a SAN, a WAN, and/or any other appropriate mechanism for transporting data between the host 402 and the storage system 404 and between the storage system 404 and the tape unit 406. Data connections between the components may be synchronous or asynchronous (or possibly a combination thereof). The host 402 may be coupled directly to the tape unit 406 (shown in FIG. 4 as a dashed line) to provide an alternative data transfer mechanism between the host 402 and the tape unit 406, described in more detail elsewhere herein.

Figure 5:
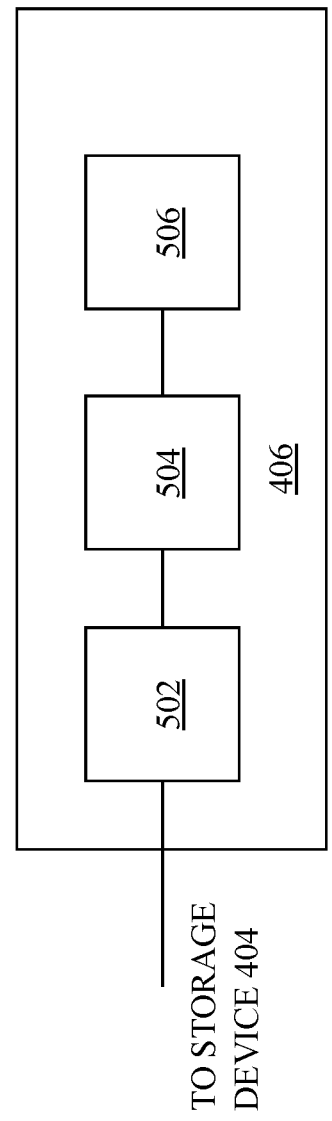
FIG. 5 is a schematic diagram illustrating a tape emulation device according to an embodiment of the system described herein.

Referring to FIG. 5, the tape unit 406 is shown in more detail as a tape emulation unit that includes a front end component 502, a data mover/server 504, and a tape emulation storage device 506 coupled thereto. The front end component 502 may include a FICON link that may be coupled to the storage system 404 for data communication between the storage system 404 and the tape unit 406. Other types of links may be used. The front end component 502 may include FICON link emulation functionality as well as tape emulation functionality, such as that provided by components of the DLm960.

The data mover/server 504 may be coupled to the front end component 502 using, for example, a GigE switch while the storage device 506 is coupled to the data mover/server 504 using any appropriate protocol, such as Fibre Channel. The data mover/server 504 may be accessed by the front end component 502 using any appropriate protocol, such as NFS (Network File System). In an embodiment herein, the data mover/server 504 may include an NFS server, such as a Celerra data mover, and the storage device 506 may be a Clarrion or Symmetrix data storage array. There may be other components used instead of, and/or in addition to, the NFS server and the data storage array.

In the system described herein, the storage device 404 is coupled directly to the tape unit 406. The storage device 404 is configured to act as a host with respect to the connection between the storage device 404 and the tape unit 406. In an embodiment herein, the storage device 404 and the tape unit 406 are coupled using a conventional FICON channel/protocol so that the storage device 404 acts as a FICON initiator to the tape unit 406. If the FICON channel at the storage device 404 supports the IBM 3590 protocol, then the tape unit 406 could be a Dell/EMC DLm960 virtual tape unit. Of course, any other type of tape unit may be used, including an actual tape drive and it is also possible to use any type of out-of-band (00B) storage.

In the system described herein, the host 402 sends metadata information to the storage device 404 to direct the storage device 404 to exchange data with the tape unit 406. Thus, relatively large amounts of data may exchanged between the storage device 404 and the tape unit 406 without transferring any data through the host 402. Moreover, unlike solutions described in U.S. Pat. No. 9,645,766 titled "TAPE EMULATION ALTERNATE DATA PATH" to Douglas E. LeCrone, which is incorporated by reference herein, the system described herein does not require that the tape unit 406 be modified from an off-the-shelf configuration since the storage device 404 emulates a host when coupled to the tape unit 406. In an embodiment herein, the host 402 provides metadata to the storage device 404 using any appropriate format that can be detected and interpreted by the storage device 404.

Figure 6:
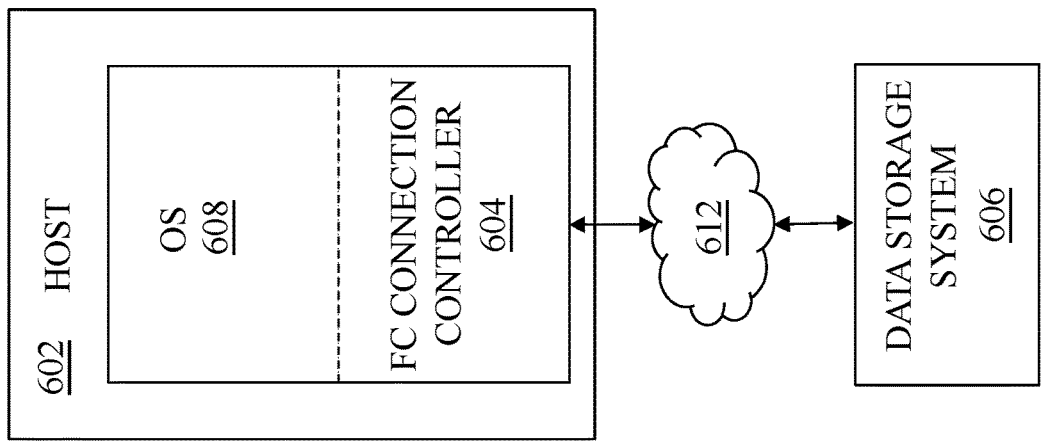
FIG. 6 is a schematic illustration showing a system with a FICON connection between a host and a data storage system according to an embodiment of the system described herein.

FIG. 6 is a schematic illustration showing a host 602 with a FICON connection controller 604 for providing a FICON connection between the host 602 and a data storage system 606 according to an embodiment of the system described herein. The host 602 is similar to the hosts 22, 22' discussed above and may be a computer running Linux or some other appropriate operating system 608. The data storage system 606 is similar to the data storage systems 24, 26 discussed elsewhere herein. I/O processing on the host 602 may operate with the FICON connection controller 604 to enable I/O operations with the data storage system 606. The FICON connection controller 604 may send and receive data to and from the data storage system 606 using a remote connection mechanism 612 that may include a network (such as the Internet, and appropriate connection thereof). The data storage system 606 may include physical storage volumes and/or logical volumes, such as Dell EMC's data storage facility. The FICON connection controller 604 may act as an I/O subsystem providing FICON communication capability. The data storage system 606 may include features and/or components enabling FICON channel communication with the host 602. For a discussion of features and implementations of FICON systems and suitable channel protocols operating therewith on z/Architecture computing systems, reference is made to J. Entwistle, "IBM System z10 FICON Express8 FCP Channel Performance Report," Technical paper, August 2009, 27 pp., which is incorporated herein by reference.

It is noted that various components of the system may be emulated. For further discussion of emulation of I/O computing components, particular Fibre Channel/FICON connection components, reference is made to U.S. Pat. No. 9,665,502 to Jones et al., issued May 30, 2017, entitled "Virtual I/O Hardware" and to U.S. Pat. No. 9,170,904 to LeCrone et al., issued Oct. 27, 2015, entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism 612 may include an Internet connection and/or possibly some other types of connection(s). In an embodiment herein, the connection mechanism 612 may be directly incompatible with a FICON connection. The incompatibility may be hardware incompatibility, software incompatibility, or both. The connection mechanism 612 may not support a direct FICON connection but, instead, rely on a FICON emulator (and/or other emulator(s)) for providing data in an appropriate format. It is further noted that where FICON emulation is being performed, the data storage system 606 may include or be coupled to a FICON emulator portion that may send and receive data to and from the connection mechanism 612 and also emulates a Fibre Channel FC0 physical layer for the benefit of the data storage system 606. Thus, in such a case involving emulation, both the host 602 and the data storage system 606 may operate as if the devices 602, 606 were communicating using a FICON hardware connection.

In an embodiment, the system described herein may be used with IBM's z High Performance FICON (zHPF) transport mode protocol implementation. zHPF enhances z/Architecture and FICON interface architecture to improve data transfer processing. In z/OS, standard FICON architecture operates with the command mode protocol, and a zHPF architecture operates with the transport mode protocol. zHPF provides a Transport Control Word (TCW) that facilitates the processing of an I/O request by the channel and the controller. The TCW enables multiple channel commands to be sent to the controller as a single entity (instead of being sent as separate commands as in a FICON channel command word (CCW)). The channel no longer has to process and keep track of each individual CCW. The channel forwards a chain of commands to the controller for execution. zHPF capable channels may support both FICON and zHPF protocols simultaneously. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

Figure 7:
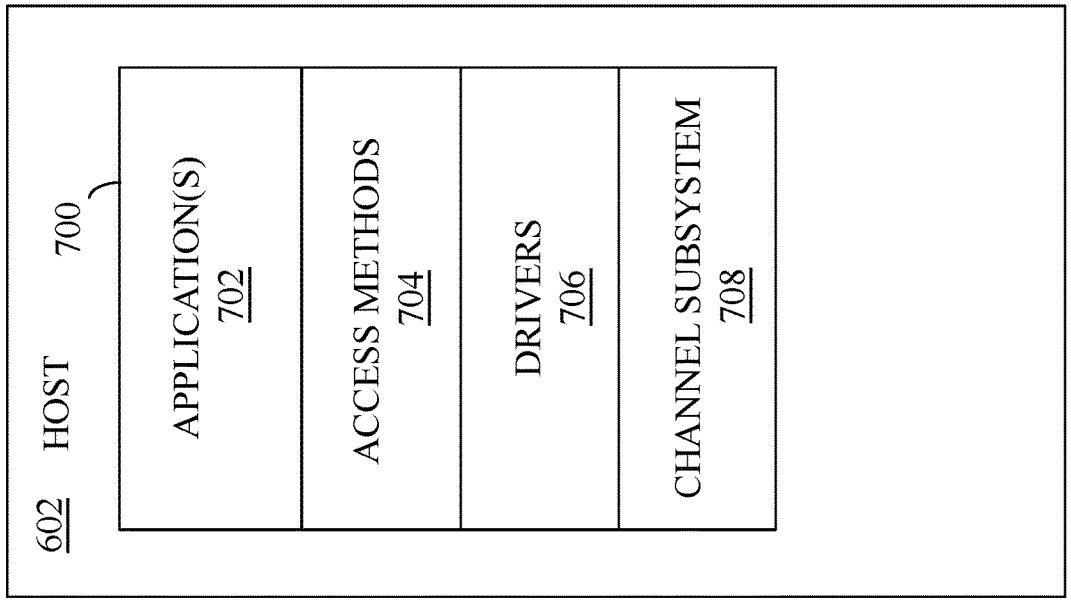
FIG. 7 is a schematic illustration showing software layers in a host according to an embodiment of the system described herein.

Referring to FIG. 7, the host 602 is illustrated with software 700 having an application(s) layer 702, an access methods layer 704, a drivers layer 706, and a channel subsystem layer 708. The application(s) layer 702 includes one or more software applications that run on the host 602. The access methods layer 704 includes I/O routines (e.g., read, write, open, etc.) that are used by applications in the application(s) layer 702 in connection with performing I/O operations. Software in the application(s) layer 702 calls specific routines in the access methods layer 704 to access data on a storage device coupled to the host.

The I/O routines in the access methods layer 704 call driver routines in the drivers layer 706 that perform lower-level device specific operations that depend upon the specific type of I/O device and the type of connection thereto. For example, a first driver for a Symmetrix storage device coupled to the host 602 by a FICON connection may be different than a second driver used for a different type of non-volatile storage device coupled to the host 602 using a different type of connection. Note, however, that an application in the application layer 702 may call the same routine (e.g., read) in the access layer 704 irrespective of the physical hardware (and connection there) used for the data, but that the routine in the access layer 704 that is called may call different routines in the drivers layer 706, depending upon a specific configuration/hardware of the system.

The channel subsystem layer 708 includes routines that control the hardware used for I/O operations, including any storage devices and channels used for transferring data between the host 602 and the storage system 606. Routines in the drivers layer 706 call routines in the channel subsystem layer 708 to perform hardware operations and to transfer data to and from the host 602 and to exchange status and control information to facilitate control of the I/O hardware. In an embodiment herein, special routines are provided in the drivers layer 706 that provide alternative processing for commands to the data storage system 606 that cause the data storage device to directly access either the cloud storage 302 (described above in connection with FIG. 3A and FIG. 3B) or directly access the tape unit 406 (described above in connection with FIG. 5).

Figure 8:
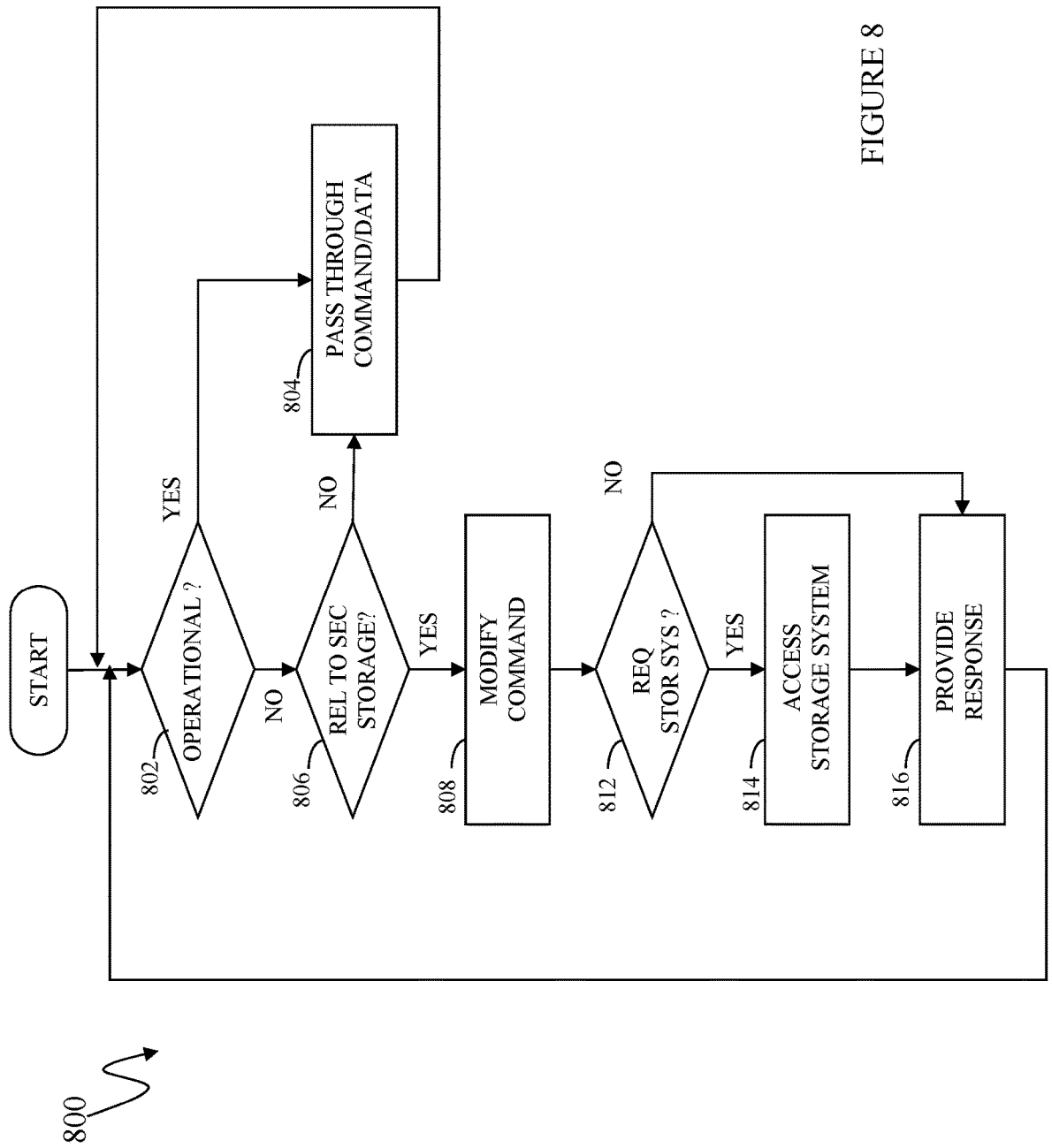
FIG. 8 is a flow diagram illustrating providing access to secondary storage according to an embodiment of the system described herein.

Referring to FIG. 8, a flow diagram 800 illustrates processing performed by the drivers layer 706 in connection with processing commands and data being transmitted from the host 602 to the data storage system 606. The system describes herein provides an alternative data path from the host 602 to secondary storage (e.g., cloud storage or a tape unit) in response to detecting that an expected data connection between the storage system 606 and cloud storage (like the cloud storage 302, discussed above) or an expected connection between the storage system 606 and a tape unit (like the tape unit 406, discussed above) is not available. Note that an expected data connection from the storage device 606 to secondary storage may not be available for any number of reasons, including a hardware failure, a communication failure, or in cases where the storage system 606 does not have the capability to communicate with cloud storage and/or a tape unit either because the storage system 606 has never been properly configured or because necessary hardware or software capabilities are not present. In such a case, the host 602 may take over and perform the transfers to the secondary storage that would otherwise be performed by the storage system 606. The takeover may occur automatically without the need to modify any applications running on the host 602 because of the use of special routines in the drivers layer 706.

Processing for the flow diagram 800 begins at a test step 802 where it is determined if expected data transfers between the storage system 606 and secondary storage are operational/available. The test at the step may be performed by examining status and capability information for the storage system 606 or may be configured manually by an operator (e.g., an operator manually indicates whether the storage system 606 is capable of directly transferring data to a cloud storage and/or a tape unit) or by some other appropriate mechanism. If it is determined at a test step 802 that the expected direct data transfers between the storage system 606 and secondary storage (cloud storage and/or a tape unit) are operational/available, then control transfers from the test step 802 to a step 804 where the drivers layer 706 passes through the command/data to the storage system 606 without any changes. For example, the command/data may instruct the storage system 606 to directly transfer specific data to a particular cloud storage. If the storage system/secondary storage mechanism is operational, the command/data to instruct the storage system 606 to directly transfer specific data to a particular cloud storage is passed through at the step 804. Of course, it is possible that the command/data passed through at the step 804 is not related to transferring data between the storage system 606 and secondary storage. Generally, commands and data from the host 602 to the storage system 606 are transmitted at the step 804 without any modification. Following the step 804, control transfers back to the step 802, discussed above, for another iteration.

If it is determined at a test step 802 that expected direct data transfers between the storage device 606 and secondary storage (cloud storage and/or a tape unit) are not operational, then control transfers from the test step 802 to a test step 806 where it is determined if the command/data being processed relates to transferring data from the storage system 606 to secondary storage. If not, then control transfers from the test step 806 to the step 804, discussed above, where the drivers layer 706 passes through the command/data to the storage system 606 with any modifications. That is, even if transferring data directly between the storage system 606 and secondary storage is not operational, commands and data that are not related to such transfers are still forwarded to the storage system 606 without any modification. The host only modifies commands that would have caused direct data access between the storage system 606 and the secondary storage. Following the step 804, control transfers back to the step 802, discussed above, for another iteration.

If it determined at the test step 806 that that the command/data being processed relates to transferring data from the storage system 606 to secondary storage, then control transfers from the test step 806 to a step 808 where the command is modified to cause the host 602 to transfer the command/data to the secondary storage device directly in place of the storage system 606 transferring the command/data to the secondary storage system. For example, if the secondary storage is cloud storage (like the cloud storage 302, described above), then processing at the step 808 may replace a command to transfer data from the cloud storage to the storage system 606 with a command that is sent by the host 602 directly to the cloud storage to transfer data from the cloud storage to the host 602. If the secondary storage is a tape unit (like the tape unit 406 described above) then processing at the step 808 may replace a command to transfer data from the tape unit to the storage system 606 with a command that is sent by the host 602 directly to the tape unit to transfer data from the tape unit to the host 602. Note that, in the case of a tape emulation device/system, such as the DLm960 tape emulation device, described above, it is also possible to provide commands that access the tape emulation storage device 506 directly (e.g., using NFS or OCFS2 access protocol).

Following the step 808 is a test step 812 where it is determined if the command/data that is being replaced at the step 808 requires any data to be accessed at the storage system 606. Note that some commands, such as a status request of the secondary storage, may not require any access to the storage system 606. Other commands, such as a command to transfer data from a tape unit to the storage system 606, may require access to the storage system 606 to, for example, store or retrieve data. If it is determined at the test step 812 that access to the storage system 606 is needed, then control transfers from the test step 812 to a step 814 where the storage system 606 is accessed (e.g., to transfer data thereto). Following the step 814 is a step 816 where the drivers layer 706 provides an appropriate response to a calling routine in an application on the host 602 that initially invoked the command. Note that the step 816 may be reached directly from the step 814, described above, if it is determined at the step 814 that access to the storage system 606 is not needed. Following the step 816, control transfers back to the step 802, described above, for another iteration.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for a host coupled to a storage system to access secondary storage coupled to the storage system and to the host, comprising:
    determining if direct data access between the storage system and the secondary storage is operational, wherein the storage system provides non-volatile storage of data;
    the host forwarding commands to the storage system to directly access the secondary storage in response to direct data access between the storage system and the secondary storage being operational; and
    the host generating modified commands to cause the host to directly access the secondary storage in response to direct data access between the storage system and the secondary storage not being operational.

2. A method, according to claim 1, wherein the secondary storage is a cloud storage.

3. A method, according to claim 1, wherein the secondary storage is a tape emulation unit.

4. A method, according to claim 1, wherein the host only modifies commands that would have caused direct data access between the storage system and the secondary storage.

5. A method, according to claim 1, wherein commands on the host are modified by a drivers layer on the host.

6. A method, according to claim 1, wherein the host accesses data on the storage system following directly accessing data on the secondary storage.

7. A method, according to claim 3, wherein the host directly accesses data of the tape emulation unit by accessing a storage device of the tape emulation unit.

8. A non-transitory computer readable medium containing software that causes a host coupled to a storage system to access secondary storage coupled to the storage system and to the host, comprising:
    executable code that determines if direct data access between the storage system and the secondary storage is operational, wherein the storage system provides non-volatile storage of data;
    executable code that causes the host to forward commands to the storage system to directly access the secondary storage in response to direct data access between the storage system and the secondary storage being operational; and executable code that causes the host to generate modified commands to cause the host to directly access the secondary storage in response to direct data access between the storage system and the secondary storage not being operational.

9. A non-transitory computer readable medium, according to claim 8, wherein the secondary storage is a cloud storage.

10. A non-transitory computer readable medium, according to claim 8, wherein the secondary storage is a tape emulation unit.

11. A non-transitory computer readable medium, according to claim 8, wherein the host only modifies commands that would have caused direct data access between the storage system and the secondary storage.

12. A non-transitory computer readable medium, according to claim 8, wherein commands on the host are modified by a drivers layer on the host.

13. A method, according to claim 8, wherein the host accesses data on the storage system following directly accessing data on the secondary storage.

14. A non-transitory computer readable medium, according to claim 10, wherein the host directly accesses data of the tape emulation unit by accessing a storage device of the tape emulation unit.

15. A system, comprising:
a storage system;
a secondary storage coupled to the storage system; and
a host, coupled to the storage system and the secondary storage system, the host including a processor that executes software on a non-transitory computer readable medium, the software including executable code that determines if direct data access between the storage system and the secondary storage is operational, wherein the storage system provides non-volatile storage of data, executable code that causes the host to forward commands to the storage system to directly access the secondary storage in response to direct data access between the storage system and the secondary storage being operational, and executable code that causes the host to generate modified commands to cause the host to directly access the secondary storage in response to direct data access between the storage system and the secondary storage not being operational.

16. A system, according to claim 15, wherein the secondary storage is a cloud storage.

17. A system, according to claim 15, wherein the secondary storage is a tape emulation unit.

18. A system, according to claim 15, wherein the host only modifies commands that would have caused direct data access between the storage system and the secondary storage.

19. A system, according to claim 15, wherein the host accesses data on the storage system following directly accessing data on the secondary storage.

20. A system, according to claim 17, wherein the host directly accesses data of the tape emulation unit by accessing a storage device of the tape emulation unit.

* * * * *